United States Patent Office 3,753,937
Patented Aug. 21, 1973

3,753,937
PERFLUORO OLEFIN VINYLIDENE FLUORIDE ELASTOMER
David A. Stivers, St. Paul, Minn., assignor to Minnesota Mining and Manufacturing Company, St. Paul, Minn.
No Drawing. Filed June 8, 1971, Ser. No. 151,128
Int. Cl. C08f 45/36
U.S. Cl. 260—28.5 D        2 Claims

ABSTRACT OF THE DISCLOSURE

Fluoro-olefinic elastomers of greatly improved processing characteristics are obtained by the inclusion of a minor amount of at least one high boiling high molecular weight ester containing one or more fatty acids and one or more alcohols, as a lubricity, softening and plasticizing aid.

---

The present invention relates to fluorinated elastomeric compositions having improved mixing, forming and molding characteristics.

The outstanding thermal stability and solvent resistance of certain fluoro-olefinic elastomers, such as the perfluoro-propene-vinylidene fluorine copolymers described in U.S. Pat. No. 3,318,854 and the perfluoropropene-vinylidene fluoride-tetrafluoroethylene terpolymers described in U.S. Pat. 2,968,459, has led to their widespread use in various applications which require elastomers of softness and flexibility over a wide range of temperatures. When properly formulated, e.g., as an extrudable mass or as a dispersion, highly fluorinated elastomers may be used to impregnate fibrous or porous materials, or to form coatings, films, vibration absorbing pads, and extruded and molded products such as O-rings, gaskets, seals, hoses, wire coatings and the like.

The processing of these elastomeric compositions has presented a multitude of problems, however, since the chemical nature of the fluorinated elastomers and their often severe use requirements have restricted the number of processing aids and plasticizers which may be employed in the formulations. Milling operations have often developed elevated temperatures requiring roll cooling; molding has often required prolonged cycles and elevated temperatures; and extruded parts have tended to have rough surfaces. Low molecular weight oxygen-containing hydrocarbon derivatives, such as ketones and esters, while compatible with the elastomers, are extractable, for example, by lubricating oils and hydraulic fluids. Relatively large amounts are required, e.g., up to 15%, and the resulting product is subject to shrinkage and deformation during cure and use. Most highly fluorinated oils are not compatible in sufficient quantities to obtain the desired level of softness and lubricity. When more than compatible quantities of plasticizer are added to the fluorinated elastomer in order to plasticize the gumstock, they render the uncured mass difficult to process (e.g., mill and extrude) due to extreme surface lubricity. Particularly in the case of extrusions, the incompatible plasticizer will exude when pressure is developed in the extruder, unduly lubricate the feed screw and stop passage of the stock through the equipment; undue bleeding occurs during molding and curing.

It is therefore an object of this invention to provide fluorinated elastomers having an improved combination of properties.

A further object is to provide a material, the inclusion of which facilitates the processing of said elastomeric compositions.

A still further object is to provide a fluorinated elastomer having improved extrusion and molding characteristics.

The above objects are realized by the incorporation of high boiling, high molecular weight, i.e., containing at least about 15 carbon atoms, esters, including those generally classified as waxes, i.e., esters of hydrocarbon carboxylic acids containing from about 10 to about 36 carbon atoms and alcohols containing from about 10 to 36 carbon atoms; preferably each can contain about 14 to 30 carbon atoms. Esters such as the fully or partially esterified glycerides exemplified by bayberry wax, coconut oil, glycerol dioleate and the like are also useful. Dihydroxy alcohols, such as the alpha-omega diols found in carnauba wax, or dibasic long chain carboxylic acids can be incorporated in the esters. Long-chain acids may be esterified with shorter-chain polyols, such as glycerol, pentaerythritol, trimethylolpropane, tetraethylene glycol, and the like. Similarly, low molecular weight polybasic carboxylic acids such as adipic acid, citric acid, ethylenediaminetetraacetic acid, and the like, may be incorporated in the ester combined with long-chain alcohols. Hydrocarbon waxes with little or no oxygen content, such as the petroleum waxes or polyethylene, are not generally useful.

The additives provide several different functions in improving processability. In one aspect, the lubrication of the die or mold by the gumstock is improved. This feature promotes easy release from molds after the initial curing step and produces a smooth finish and sharp edges on the fabricated part. For this purpose a material with limited solubility in the gumstock is desirable, allowing a significant fraction of the additive to bloom to the surface and act as a releasing lubricant.

In another aspect compatability, i.e., relatively good solubility in the gumstock, is necessary to decrease the "nerve" of the stock. The fluorinated olefin polymers are relatively high molecular weight, very tough, high modulus materials and a softening action is required to facilitate milling, ready mixing of the various compounding ingredients, and easier extrusion through a die. Characteristically, the very tough gums require so much pressure to force them through the die openings that the extruded stock is much larger than the die opening. Optimum softening of the material results in an extrudate no more than 40%, preferably 10 to 25%, larger than the die dimensions. For this purpose, the compatibility apparently imparted by the oxygen content of the additives is helpful. On the other hand, too high an oxygen content, particularly in the form of relatively polar hydroxyl and carboxyl groups is disadvantageous in that they tend to affect the cure rate of the composition and adversely affect the final properties of the cured material. For example, glycerol triesters of 18 carbon fatty acids, such as coconut oil, function well as additives but glycerol monostearate, with two excess hydroxyl groups to only 21 carbon atoms slows down the rate of cure. In conventional elastomer processing it is customary to add, as lubricity aids, materials such as stearic acid, calcium stearate, zinc stearate and the like. These ionic fatty acid derivatives have been found to be very undesirable in fluoroelastomer compositions because they unduly decrease the rate of cure, making it extremely difficult to obtain a suitably balanced formulation.

The third function of the additive is to plasticize the gumstock to produce an extrudate which has the ability to hold together rather than to split, in narrow sections, and provide a ragged profile. This internal cohesiveness is achieved by the waxy additives without introducing "tack" or stickiness; the low molecular weight oxygenated solvents produce a plastic gumstock, but at the expense of a sticky tacky surface.

The high molecular weight additives of the present invention show beneficial effects when as little as 0.25% are compounded into the formulation. Generally, additives in the range of 0.5 to 3% produce optimum results, and seldom is more than 5% necessary. However, an especially convenient method of adding the waxes to a formulation is by means of a "master batch." Many of these waxes are particularly compatible with the gumstock. For example, carnauba wax can be incorporated in amounts up to 30% by weight of elastomer in a stable compound. For example, 10% of master batch on the weight of elastomer in the desired compound can be incorporated readily on the mill in the formulation without having to weigh out and separately handle the waxes, thus simplifying and speeding up the compounding of the final product. Some of the waxes, such as bayberry, with lower compatability cannot be incorporated in high percentages and should be used in about the desired amount, such as 1 to 5%.

Pure compounds are seldom necessary and in many cases less desirable than the crude or naturally occurring form of the compounds or mixtures. Synthetic waxes, which can be obtained in relatively pure form, are useful and compositions conferring optimum characteristics can be prepared; however, the naturally occurring waxes, which are normally mixtures and, because of their ready availability and lower cost, are frequently preferred. Mixtures of natural, synthetic, or natural and synthetic products can frequently be used to obtain superior results to the separate compositions. Some of the waxes are more effective, per unit weight, in plasticizing the elastomers but do not provide as good lubricity as others; conversely, certain of the materials provide high lubricity but do not adequately decrease the nerve of the formulation. Mixtures of the two, such as mixtures of one to four parts of carnauba with four to one parts of montan wax provide results which are far superior, at a given concentration, to results with either component alone. The constitution of waxes useful as additives is described, for example, in Warth, The Chemistry and Technology of Waxes, second edition, Rheinhold 1956, particularly chapters 2–4, 6 and 7.

It is to be understood that the modified elastomer formulations may include the conventional fillers and pigments and the same curing or vulcanizing agents commonly employed with fluorinated elastomers. Milling, molding, extruding and other processing operations are carried out using normal procedures and operating conditions except that the processing aids make it possible to use lower operating temperatures and lower operating pressures than have been required in the past.

In order to more clearly point out the advantages of the invention the following example is provided.

EXAMPLE

Ten fluorinated elastomer formulations (A through K) were prepared having the components shown in the accompanying table.

The ingredients, including the elastomer, are milled in the conventional manner for a period of about ten to about thirty minutes in which the temperature is usually maintained below about 150° F. The ingredients may be admixed prior to milling or they may be admixed with the elastomer during milling. After the milling operation has been completed to thoroughly mix the ingredients of the vulcanization recipe into the elastomer, the composition is further processed by molding or extruding.

In molding, the elastomer composition is molded in a press for about 10 to about 30 minutes at a temperature between about 275° F. and about 400° F. Thereafter the molded composition is removed from the mold and post cured in an oven at a temperature between about 350° F. and about 500° F. or higher for a period of several hours, to as much as 48 hours. The need for a special mold spray is reduced and in some cases eliminated in molding the modified elastomer formulations.

TABLE

| | Formulations (parts by weight) | | | | | | | | | |
|---|---|---|---|---|---|---|---|---|---|---|
| | A | B | C | D | E | F | G | H | J | K |
| Elastomer ($C_3F_6$/$CF_2$=$CH_2$ 24/76 mol ratio) | 100 | 100 | 100 | 100 | 100 | 100 | 100 | 100 | 100 | 100 |
| Carbon black (medium thermal) | 30 | 30 | 30 | 30 | 30 | 30 | 30 | 30 | 30 | 30 |
| Magnesium oxide | 10 | 10 | 10 | 10 | 10 | 10 | 10 | 10 | 10 | 10 |
| Calcium hydroxide | 2 | 2 | 2 | 2 | 2 | 2 | 2 | 2 | 2 | 2 |
| 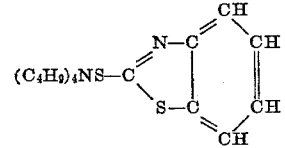 | 0.33 | 0.33 | 0.33 | 0.33 | 0.33 | 0.33 | 0.33 | 0.33 | 0.33 | 0.33 |
| Hydroquinone | 1 | 1 | 1 | 1 | 1 | 1 | 1 | 1 | 1 | 1 |
| Cinnamylidene trimethylene diamine | 0.5 | 0.5 | 0.5 | 0.5 | 0.5 | 0.5 | 0.5 | 0.5 | 0.5 | 0.5 |
| Carnauba, Flora | 1 | | | | 0.7 | 1 | | | | |
| Carnauba, North Country #3 | | 1.5 | | | | | | 1 | | |
| Carnauba, #1 yellow | | | 2.0 | | | | | | 1.3 | |
| Bayberry, pure crude | | | | 0.7 | 0.3 | | | | 0.7 | |
| Montan, imported German WRG flakes | | | | | | 0.5 | | 0.5 | | |
| Candelilla, prime crude | | | | | | | 0.5 | | | |
| Mixing characteristic | Good | Good | Good | Good | Good | Good | Good | Excellent | Excellent | |
| Garvey die ratings: | | | | | | | | | | |
| Surface | A | A | A | A | A | A | A | A | A | A |
| Edge | 8 | 9 | 9 | 8 | 9 | 9 | 9 | 10 | 9 | 8 |
| Swell | 30 | 30 | 30 | 30 | 25 | 15 | 25 | 45 | 30 | 60 |

The thoroughly mixed elastomer compositions above were extruded in a one-inch extruder using the Garvey Die. The temperature of the extruder barrel and the die was approximately 175 to 200° F. The quality of the extrudate was rated according to the rating technique set forth in Morton, Introduction To Rubber Technology, Rheinhold, 1959, page 199. The rating technique evaluates and rates the three main extrusion factors, viz, surface, sharpness of edges and extrusion swell. The type of edge is rated from 10 to 1 and surface from A to E, both ratings running from good to bad. Extrusion swell is a numerical value (percentage of swell). Extrusions, under the rating technique, are clearly identified by a number for the edge, a letter for the surface and a percentage for swell.

The minimum extrusion requirements for elastomers were selected as A–7–40. To obtain a satisfactory rating, the elastomer processing aid must modify the elastomer characteristics to meet all three of the minimum extrusion requirements for surface, edge and extrusion swell.

In addition, the elastomer modifier should preferably show an improvement over the unmodified elastomer in the following respects:

(A) Reduce the time required for milling and mixing the elastomer.

(B) Reduce sticking of the raw gum and the completely mixed compound through all stages of the mixing operation.

(C) Produce superior mold release characteristics in the finally cured compound to a degree that allows reduction or elimination of mold release agent.

(D) Exhibit no more than a minor effect on the cure rate of the modified elastomer vis-a-vis the unmodified elastomer.

It will be noted that all of the modified elastomer formulations, except formulation H, exceeded all of the desired requirements. Formulation H, which was unacceptable because it exceeded the desired extrusion swell rating, nevertheless possessed markedly improved characteristics when compared to the unmodified elastomer formulation K.

The best single additive for balanced results has been carnauba wax. This wax is obtained in a number of grade designations, such as #1 Yellow, Flora, North Country #3, #3 Chalky, Pure Refined and Technical Refined. All except the "Technical Refined" grade have provided satisfactory results when used at no more than 3 parts by weight of elastomer. The Technical Refined grade, obtained by solvent purification, is a relatively high melting wax due to the removal of certain of the lower melting components that occur in the natural product. These lower melting components apparently improve compatability and to some extent lubricity of the higher melting portions. To function satisfactorily, the Technical Refined grade must be used in conjunction with another material, such as montan wax in a ratio of about 5 parts of Technical Refined carnauba to 0.5 to 10 parts of montan wax.

Other "waxes" and "oils," either individually or in combination, which have been found to be useful as elastomer modifiers according to the present invention are beeswax, japan wax, ouricury, methyl stearate and tristearin.

Other fluoro-olefinic elastomers in which at least fifty percent of the substituents on the catenary carbon atoms are fluorine are suitably modified by the additives of the present invention and include elastomers such as are described in U.S. Pat. No. 3,331,823.

What is claimed is:

1. In a curable fluoro-olefinic elastomer composition which is easily millable, moldable and extrudable, the improvement comprising including a minor amount of at least one compatible high boiling high molecular weight fatty acid ester as a lubricity, softening and plasticizing aid, said lubricity, softening and plasticizing aid comprising carnauba wax.

2. The elastomer formulation of claim 1 wherein the lubricity, softening and plasticizing aid additionally comprises montan wax, the carnauba wax and montan wax being present in a ratio of 1:4 to 4:1.

References Cited

UNITED STATES PATENTS

| | | | |
|---|---|---|---|
| 2,476,606 | 7/1949 | Johnston | 260—23 XA |
| 2,849,412 | 8/1958 | Robb | 260—31.8 F |
| 3,318,854 | 5/1967 | Honn | 260—86.3 |
| 3,331,823 | 7/1967 | Sianesi | 260—87.7 |
| 2,770,615 | 11/1956 | Kroncke | 260—28.5 D |
| 2,862,899 | 12/1958 | West | 260—28.5 D |
| 3,147,323 | 9/1964 | Boyer | 260—23 XA |

OTHER REFERENCES

A. H. Warth, "The Chemistry and Technology of Waxes," 2d edition, Rheinhold Pub., New York, 1956, pp. 535 and 536.

Modern Plastics Encyclopedia for 1968, vol. 45, No. 1A, September 1967, pp. 472 and 473.

MORRIS LIEBMAN, Primary Examiner

P. R. MICHL, Assistant Examiner

U.S. Cl. X.R.

260—23 XA